N. PLATT, Inventor.

Sheet 1. 3 Sheets.

Seymour & Morgan.

Harvester Rake.

No 593

Reissued Aug. 31, 1858.

N. PLATT, Inventor.

Sheet 2. 3 Sheets

Seymour & Morgan.

Harvester Rake.

No. 593

Reissued Aug. 31, 1858.

N. PLATT, Inventor.
Sheet 3. 3 Sheets.
Seymour & Morgan.
Harvester Rake.
No 593
Reissued Aug. 31, 1858.
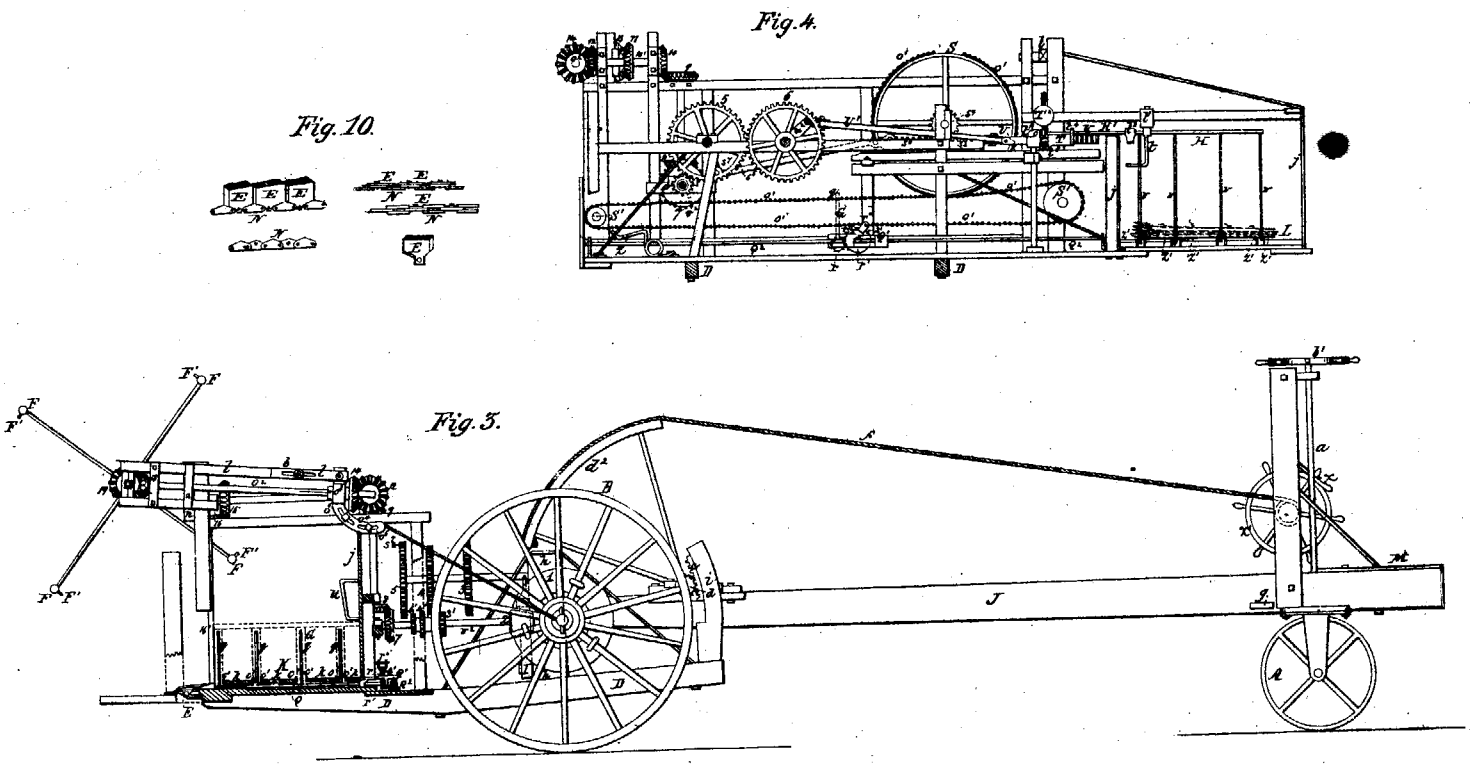

UNITED STATES PATENT OFFICE.

W. H. SEYMOUR AND D. S. MORGAN, OF BROCKPORT, NEW YORK, ASSIGNEES OF N. PLATT.

IMPROVEMENT IN HARVESTERS.

Specification forming part of Letters Patent No. 6,517, dated June 12, 1849; Reissue No. 265, dated May 23, 1851; Reissue No. 593, dated August 31, 1858.

DIVISION D.

*To all whom it may concern:*

Be it known that NELSON PLATT, formerly of Ottawa, in the county of La Salle and State of Illinois, late of Kendall county, in the same State, (assignor to WILLIAM H. SEYMOUR and DAYTON S. MORGAN, of Brockport, in the county of Monroe and State of New York,) did invent a new and useful Improvement in Machines for Cutting and Raking Grain or Grass, of which the following is a full, clear, and exact description, reference being had to the accompanying drawings, which make part of this specification, and in which—

Figure 1:
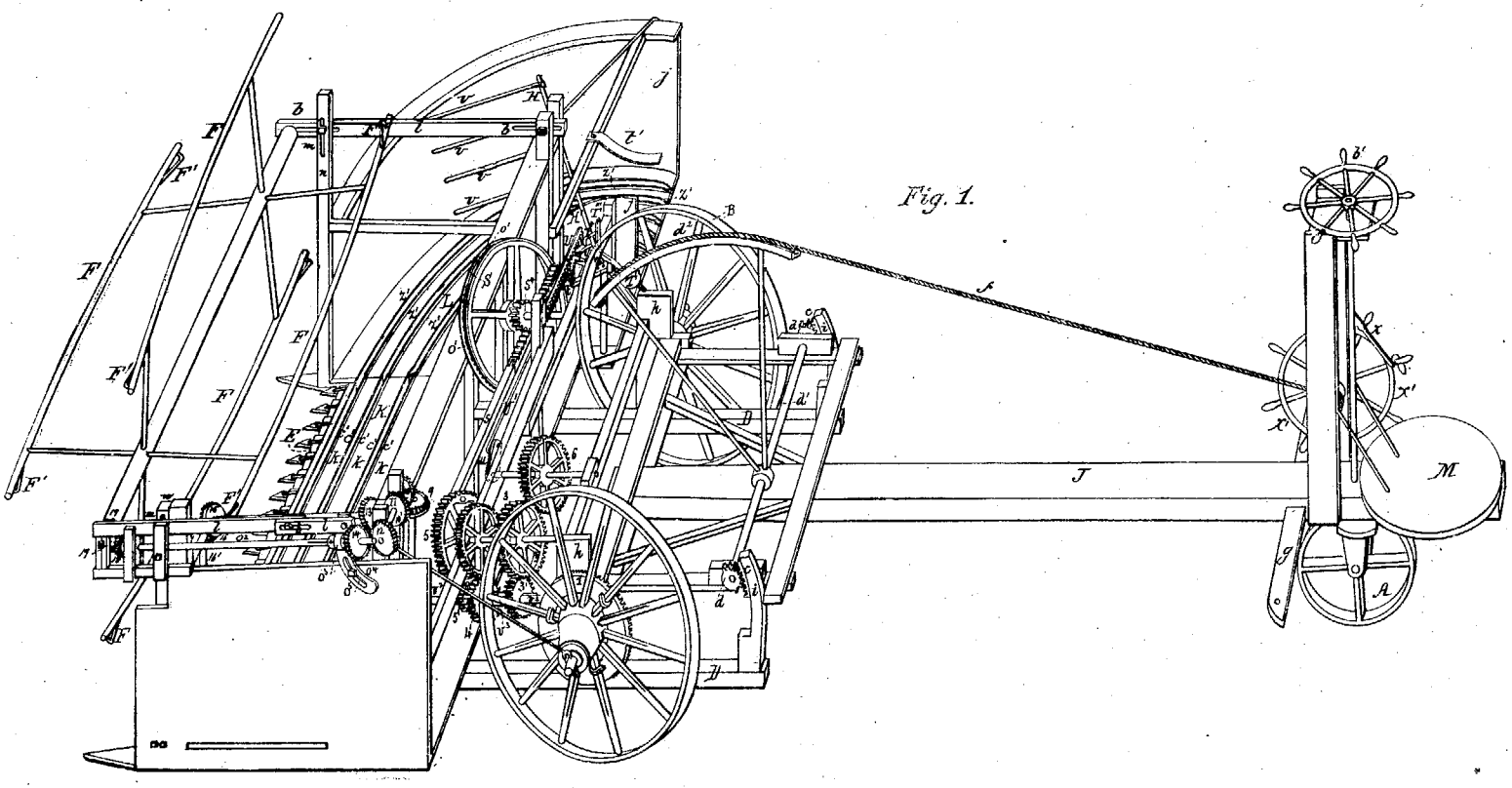
Figure 2:
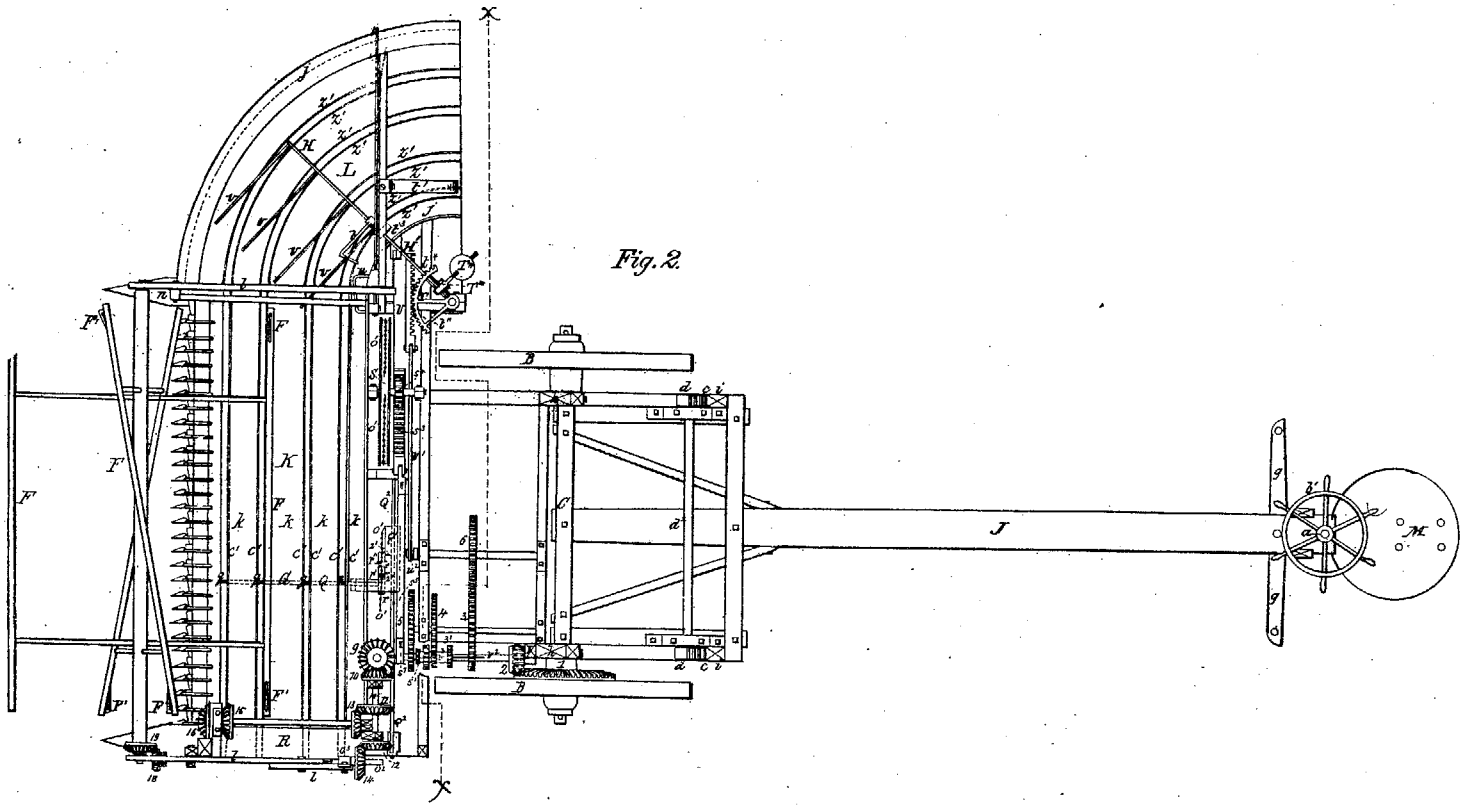

Figure 1 represents a view in perspective, and Fig. 2 a plan or top view, of a machine embracing the said improvement. Fig. 3 represents an elevation of that side of the machine which runs next to the uncut grain, a portion of the frame being removed to expose a part of the raking mechanism and cutting apparatus; and Fig. 4 represents an elevation, seen from the rear, of that part of the machine which is in front of a vertical plane shown by the dotted line *x x* of Fig. 2.

The said improvement consists in combining a curved fence or guard with that part of the platform of the reaping-machine which is traversed by a sweep or vibrating rake.

The accompanying drawings represent a reaping-machine (fully described in other patents issued to us simultaneously with this) embracing this improvement.

The machine is shown with two kinds of rake attached to it. One of these, G, moves back and forth, with its teeth describing right lines. The other, H, is a vibrating or sweep rake, whose teeth *v v* describe curved lines by their motion.

The part L of the platform traversed by the sweep-rake H is connected by suitable framing to bearers which suspend it from the carrying-wheels B B, one of which acts as a driving-wheel to the various moving parts. It is also attached to the end of the part K of the platform which is traversed by the rectilineal rake. Curved guards *j j* are erected on the part L of the platform, upon both sides of the path traversed by the teeth of the sweep rake, and are concentric therewith.

In the operation of the rake whose path is a right line the motion of the grain does not give it a tendency to depart from that path, but in the operation of a sweep-rake this tendency is produced, and to obviate it is the object of the invention claimed under this patent. In this case the rake by a curvilinear movement changes the direction of the stalks of grain with reference to the course of the machine, and this motion (by reason of the centrifugal force imparted) gives the grain a tendency to fly off from the path of the rake. This is effectually prevented by the outer guard or fence, which keeps the grain from leaving its proper path and causes it to be delivered in regular order upon the ground. The inner guard, however, serves more especially to protect the mechanism for moving the rake, as is more particularly described in another patent issued to us simultaneously with this.

What is claimed under this patent as the invention of the said NELSON PLATT is—

The combination of a vibrating sweep-rake with a fence or guard to prevent the grain from being deflected from the path of the rake by centrifugal force, substantially as herein set forth.

In testimony whereof we have hereunto subscribed our names.

WM. H. SEYMOUR.
D. S. MORGAN.

In presence of—
GEO. H. ALLEN,
JAMES ROBY.